United States Patent [19]

Spinnler et al.

[11] Patent Number: 5,369,281
[45] Date of Patent: Nov. 29, 1994

[54] MATRIX SCREEN, PARTICULARLY A LARGE SCREEN, AND A METHOD OF MANUFACTURING IT

[75] Inventors: Vincent Spinnler, St Egreve; Marc Arques, Grenoble, both of France

[73] Assignee: Thomson Tubes Electroniques, Velizy, France

[21] Appl. No.: 16,900

[22] Filed: Feb. 12, 1993

[30] Foreign Application Priority Data

Feb. 18, 1992 [FR] France ................. 92 01810

[51] Int. Cl.⁵ ................................................ G01T 1/24
[52] U.S. Cl. ............................ 250/370.09; 250/208.1;
257/428; 257/443; 219/121.67
[58] Field of Search .............. 250/208.1, 370.09;
257/443, 428, 429, 466; 219/121.67; 437/924,
984

[56] References Cited

U.S. PATENT DOCUMENTS

| | | | |
|---|---|---|---|
| 3,453,097 | 7/1969 | Hafner | 219/121.67 |
| 3,594,761 | 7/1971 | Boesen | |
| 4,695,716 | 9/1987 | Tandon et al. | 250/208.1 |
| 4,860,075 | 8/1989 | Araghi et al. | 250/208.1 |
| 5,105,087 | 4/1992 | Jagielinski | 250/390.09 |
| 5,214,261 | 5/1993 | Zappella | 219/121.67 |

FOREIGN PATENT DOCUMENTS 0397965 11/1990 European Pat. Off.
2054933 2/1981 United Kingdom.

*Primary Examiner*—Carolyn E. Fields
*Attorney, Agent, or Firm*—Roland Plottel

[57] ABSTRACT

The invention is applicable to matrix detector or display screens formed by assembling several elementary screens. A matrix screen according to the invention comprises several elementary screens (E1 to E4) spliced together on one of their edges (10, 11). According to the invention, each elementary screen (E1 to E4) includes a mechanical stop device (B1 to B4) which mates with a mechanical stop device on an elementary screen to which it is spliced so that the two elementary screens are positioned relative to each other. This arrangement avoids long and difficult alignment and indexing during the assembly of the elementary screens (E1 to E4) since these operations are completed when the elementary screens are cut, this operation itself requiring the use of accurate alignment and indexing tools.

8 Claims, 3 Drawing Sheets

MATRIX SCREEN, PARTICULARLY A LARGE SCREEN, AND A METHOD OF MANUFACTURING IT

BACKGROUND OF THE INVENTION

The invention applies to matrix screens of the type formed by assembling several elementary screens, each elementary screen comprising a matrix of active elements or pixels. More precisely, the invention is a method of facilitating and simplifying the alignment of the pixels and the splicing of the elementary screens.

Matrix arrangements are frequently used in screens to detect various types of radiation and in flat display screens.

The manufacture of certain relatively large matrix screens poses major problems to the extent that they are often produced by assembling several elementary circuits or screens. Such problems are encountered particularly with C.C.D. (Charge-Coupled Device) image detector screens, each detector screen consisting of an assembly of several elementary detector screens, measuring approx 1.5 mm by 1.5 mm.

The normal method of producing a matrix screen as described above, i.e. using several smaller screens referred to as elementary screens, involves, as a first step, cutting each elementary screen as close as possible to the active zone containing the active elements or pixels. The non active zone remaining on each elementary circuit must be as small as possible to avoid increasing the space between two rows or columns of pixels on adjacent spliced elementary screens compared to the space between rows or columns formed in a given elementary screen. Cutting the elementary screen close to the active zone requires extremely accurate alignment and is, therefore, a long, delicate operation.

The next step is to index the elementary screens relative to each other so that the lines and rows of pixels on each elementary screen are aligned with those on the neighboring screen (to within the required degree of accuracy) to respect the geometry of the image detected or displayed. This is a further delicate alignment operation which requires complex tools.

Three cutting processes are normally used: cutting with a diamond-tipped blade, cleaving the substrate and cutting by chemical etching.

Cutting with a rotary diamond-tipped sawblade generally has several disadvantages:
- the heat and mechanical stresses induced interfere with the properties of materials close to the cutting line, deteriorating the electrical properties of the active circuit and imposing an inactive zone whose width is at least that of the zone affected by the cutting operation;
- the substrate tends to chip along the cutting line and this must be allowed for in determining the width of the inactive zone between the cutting edge and the edge of the active zone;
- a risk of contaminating the sensitive surface (cutting dust, cooling fluids, etc.);
- absolute control of the cutting process and reliable, repeatable equipment is required to achieve the necessary accuracy (the specifications are at the limit of what can be achieved in the prior art).

Cleaving the circuit or substrate is only possible if the circuit is produced on a monocrystalline substrate whose orientation was selected to allow cleaving parallel to the matrix directions. This technology limits both the substrate used, i.e. the type of screen, and the matrix production process (the patterns must be aligned with the crystal orientations).

Finally, chemical etching is a relatively slow method, not really compatible with industrial requirements.

The patterns, i.e. the pixels on the various screens, are generally aligned by optical sighting. This method requires special equipment which allows circuits to be moved relative to each other. The precision of the movement along all three axes (X, Y and Z) must be compatible with the size of the patterns being aligned (for example precision better than 10 mm is required for 100 mm patterns).

The indexed positions must then be retained until the elementary screens are attached to a support (for example by bonding). The indexing equipment must, therefore, fulfil a further function.

This method can be applied, with no major difficulty, to small (<20 mm) elementary screens but becomes particularly onerous for screens measuring some tens of mm along one side.

For example, the method is virtually unusable to produce large (for example, 40 cm×40 cm) X-ray detection panels for use in radiodiagnostics.

As an example, X-ray detector panels are generally based on an insulating substrate, particularly glass, on which a matrix of amorphous silicon photosensitive elements, for example photodiodes, is produced using thin-film techniques.

These photosensitive elements form a matrix which is then exposed to light from a scintillating screen that converts X-rays into light. The pitch between the rows and columns is, for example, 100 mm. X-ray detector screens, of this type, measuring approx 200×200 mm, are manufactured routinely.

However, serious problems are encountered in producing larger screens, particularly due to the fragility of the substrate if glass is used. It is, therefore, very penalizing not to be able to use the elementary screen assembly technique described above to produce large X-ray detector panels from several panels measuring, for example, 200 mm×200 mm and each forming an elementary screen spliced along its edges.

SUMMARY OF THE INVENTION

The method according to the invention avoids the problems involved in assembling several elementary screens described above. It is applicable to detection or display matrix screens and is advantageous regardless of the size of the matrix screen to be produced.

In a matrix screen according to the invention, formed from at least two elementary screens each comprising a matrix of active elements of pixels and spliced to another elementary screen along at least one edge, each elementary screen including a mechanical stop device which, in conjunction with a mechanical stop device on the adjacent elementary screen, positions the two elementary screens relative to each other.

The invention is also a method of assembling elementary matrix screens in which the elementary screens are spliced along at least one of their edges and in which each edge to be spliced includes a cut shape, the shapes of the two edges to be spliced mating together.

BRIEF DESCRIPTION OF THE DRAWINGS

The invention will be better understood and other advantages will become clear upon reading the following description, referring to the appended figures of which.

MORE DETAILED DESCRIPTION

Figure 1:
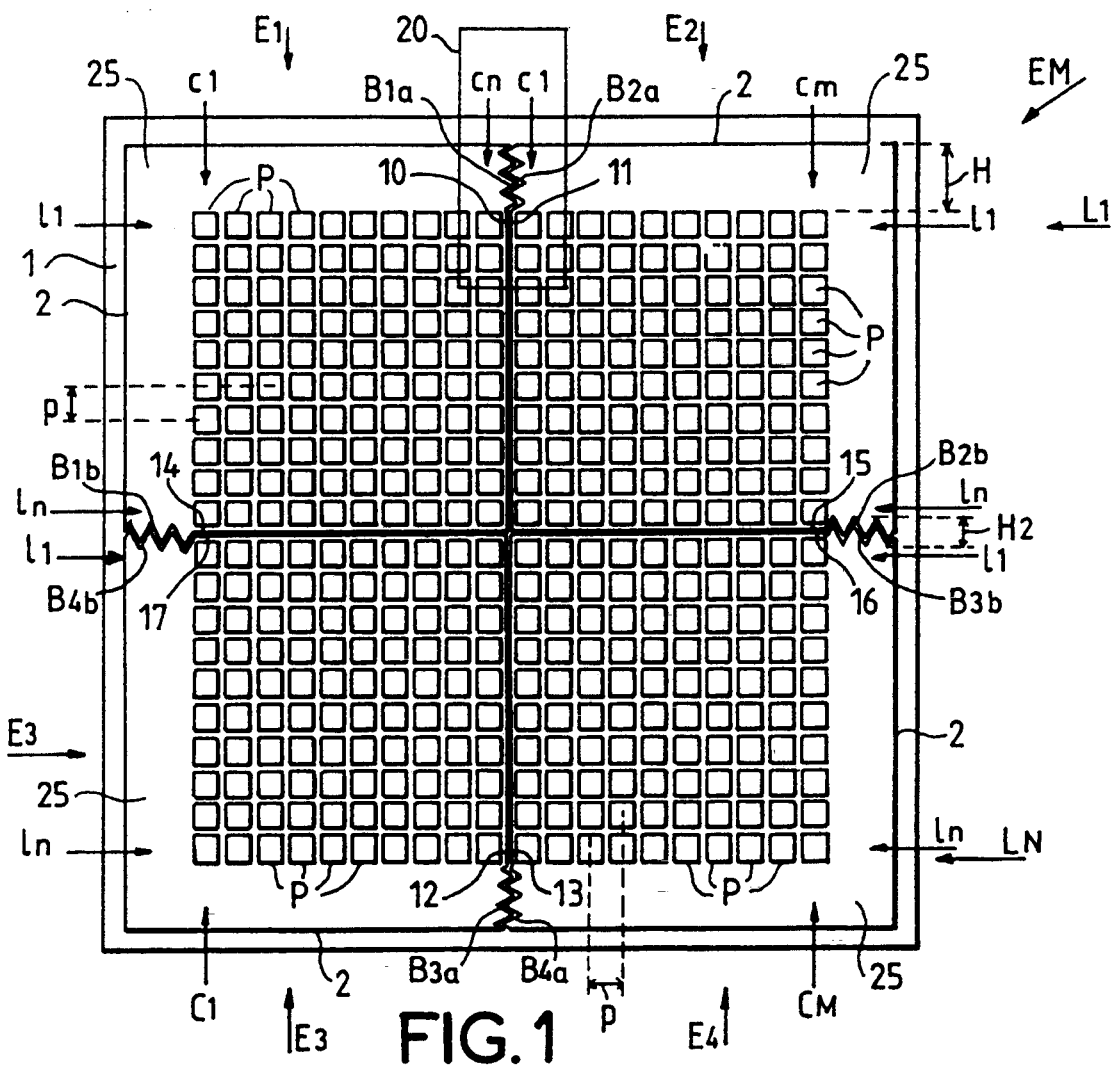
FIG. 1 is a schematic representation of one type of matrix screen according to the invention.

FIG. 1 is a schematic plan view of a matrix screen EM according to the invention. Matrix screen EM is formed from several elementary screens E1, E2, E3 and E4 assembled or spliced together. Elementary screens E1 to E4 are assembled, for example, by bonding to the same support plate 1.

Each elementary screen carries a matrix of active elements or pixels P, arranged on the same pitch p into rows l1 to ln and columns c1 to cm (obviously, the line and row pitch can be different). Elementary screens E1 to E4 are attached to support plate 1 so that rows l1 to ln on the first and third elementary screens E1 and E3 are aligned with the rows on the second and fourth elementary screens E2 and E4 respectively and columns c1 to cm on the first and second elementary screens E1 and E2 are aligned with the columns on the third and fourth elementary screens E3 and E4 respectively.

Consequently, matrix screen EM has N rows L1 to LN and M columns C1 to CM of pixels, where N is the sum of the lines on the elementary screens adjacent to each other in the column direction and M is the sum of the columns on the elementary screens adjacent to each other in the direction parallel to the rows.

Elementary screens E1 to E4 (and, therefore, matrix screen EM) can be display screens (for example liquid crystal screens, plasma panels, etc.) or radiation detection screens sensitive, for example, to infrared, visible light or X-rays. In the last two cases, the elementary sensors or pixels P are, for example, photosensitive diodes; to detect X-rays, a scintillation screen (not shown) is placed between the radiation source and the pixels.

Assuming that matrix screen EM is designed to acquire a light image produced by converting X-ray photons, each elementary screen E1 to E4 can be produced on a substrate 2 which may be silicon or, more normally, glass, the substrate carrying a matrix of photodiodes produced from amorphous silicon using the thin-film technique. This technology can be used to produce detector panels measuring, for example, up to 20 cm×20 cm with pixels P arranged on a pitch p of approx 100 micrometers. The invention allows such detector panels, despite their already large dimensions, to be used to produce elementary screens E1 to E4.

According to another characteristic of the invention, each elementary screen E1 to E4 includes at least one mechanical stop device $B1_a$ to $B4_a$ and $B1_b$ to $B4_b$, this device mating with a mechanical stop on the elementary screen to which it is spliced to position the two elementary screens relative to each other.

For elementary screens E1 to E4, spliced to extend columns C1 to CM, these stop devices align the columns on one elementary screen with those on the other; for elementary screens positioned to extend rows L1 to LN, the stop devices align the rows on the two elementary screens.

Stop devices $B1_a$ to $B4_a$ and $B1_b$ to $B4_b$ form mechanical datums positioned, on each elementary E1 to E4, relative to one or several pixels P on the screen but also relative to the mechanical datum formed on the adjacent elementary screen.

In the example described, which is not exhaustive, the stop devices comprise mating shapes cut into the edges of adjacent spliced elementary screens.

The first and second elementary screens E1 and E2 being spliced together, they are in contact along one of their inner edges 10 and 11 parallel to columns C1 to CM: the inner edge 10 of the first screen E1 carries a stop device consisting of cut shape $B1_a$ which mates with cut shape $B2_b$, i.e. the stop device carried by the inner edge 11 of the second elementary screen E2.

These two elementary screens are positioned relative to each other by mating the male and female parts of the two stop devices $B1_a$ and $B2_a$.

Figure 1A:
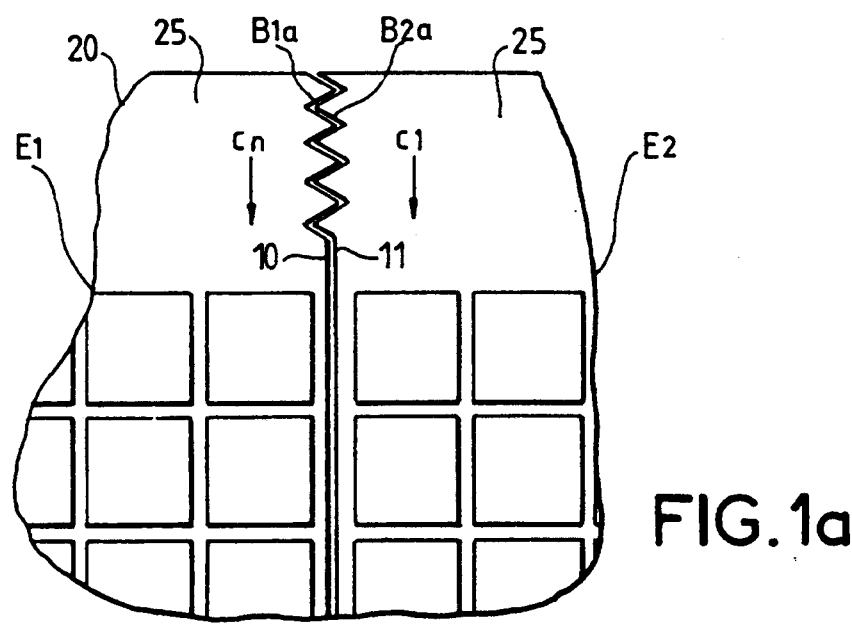
FIG. 1a is a magnified view of a boxed-in area on FIG. 1.

FIG. 1a is a magnified view of the boxed-in section 20 on FIG. 1, this magnified view representing part of the first and second elementary screens E1 and E2. In particular, FIG. 1a shows the mating cut shapes which form the mechanical stop devices $B1_a$ and $B2_a$ carried by the inner edges 10 and 11 of these elementary screens. In the example shown, which is not exhaustive, the stop devices have a sawtooth shape but any other shapes including at least a recess relative to the inner edge and/or at least a part protruding into the other inner edge could be suitable.

Again referring to FIG. 1, it can be seen that the third and fourth elementary screens E3 and E4 are spliced together by stop devices $B3_a$ and $B4_a$ formed respectively in an inner edge L2 and an inner edge L3 parallel to rows C1 to CM on the third and fourth elementary screens E3 and E4 respectively.

Elementary screens E1 to E4 each also includes a second stop device $B1_b$ to $B4_b$ along their second inner edges 14, 15, 16 and 17, parallel to rows L1 to LN. This second set of stop devices are similar to the first set, consisting of cut shapes in the second inner edges 14 to 17 mating with shapes in the adjacent inner edges. Mating these male and female parts positions the elementary screens so that the columns on screens E1 and E2 are aligned with the columns on screens E3 and E4 respectively.

The cut-outs which form the mechanical stop devices are produced in inner edges 10 to 17 in the peripheral zone 25 of each elementary screen E1 to E4, in a zone which contains no pixels P but which surrounds the pixels. In fact, with conventional methods of producing detector panels such as those used to form elementary screens E1 to E4, each panel includes an active zone containing the pixels and a peripheral or inactive zone around the active zone. The height H of peripheral zone 25 is typically approx 20 mm when the edge is 20 cm long. To avoid an excessive space between two adjacent lines L1 to LN or two adjacent columns C1 to CM on different elementary screens E1 to E4, height H is considerably reduced along the inner edges 10 to 17 which are to be spliced.

Because the stop devices are produced in the peripheral zone 25 remaining on each elementary screen, the height H2 of the cut-outs forming stop devices $B1_a$ to $B4_a$ and $B1_b$ to $B4_b$ can be greater than the distance between two adjacent columns or lines lying on different elementary screens E1 to E4. Moreover, repeating the cut-out pattern provides a useful safety margin if one of the male parts is broken.

The example shown in FIGS. 1 and 1a uses a sawtooth cut-out as a stop device but the cut-outs could be machined in several forms to suit the way in which elementary screens E1 to E4 are to be spliced. For example, they could be a notched form as shown in FIG. 2 or a circular arc as shown in FIG. 3 (to simplify FIGS. 2 and 3, the pixels are not shown individually but are represented by active zone 26).

Figure 2:
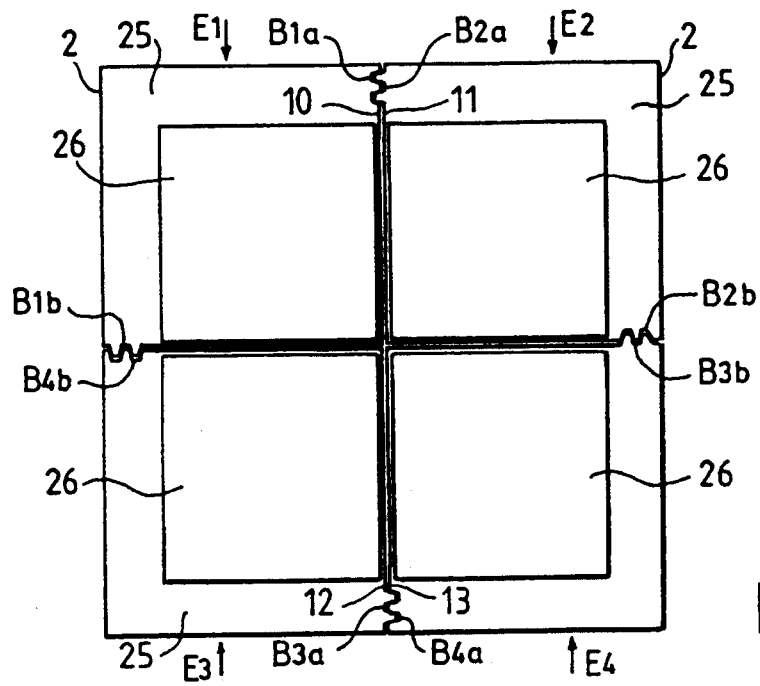
FIG. 2 and 3 represent different forms of the stop device shown on FIG. 1.

The notch shape shown in FIG. 2 is applicable to all cases but requires large functional clearances.

Figure 3:
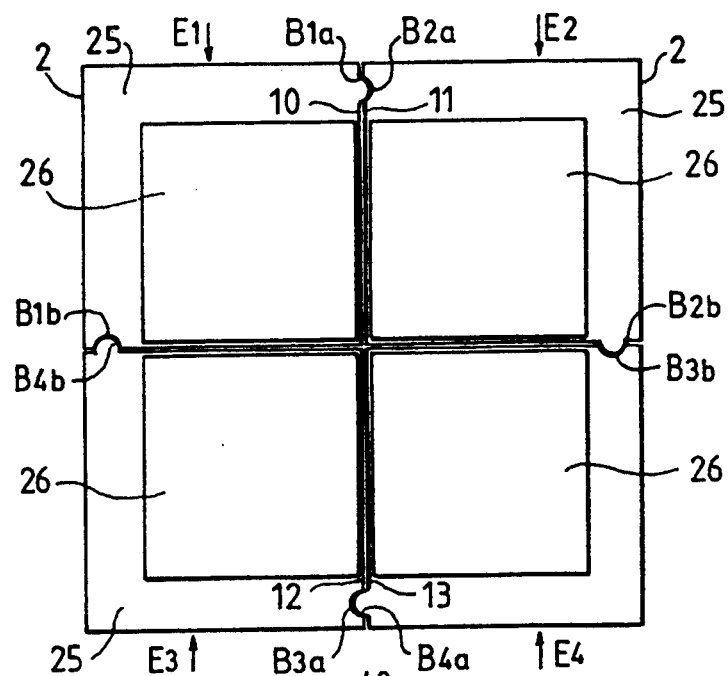

The sawtooth shape shown in FIGS. 1 and 1a is suitable for linear splicing while the circular arc form shown in FIG. 3 is suitable for matrix splicing.

It should be noted that the elementary screens E1 to E4 shown in the example in FIG. 1 can be assembled in three stages: for example, the first and second elementary screens E1 and E2 are assembled in a first stage to form a first subassembly, the third and fourth elementary screens E3 and E4 are assembled to form a second subassembly and, finally, the two subassemblies E1-E2 and E3-E4 are assembled.

To allow all stop devices B1 to B4 to be in a peripheral zone 25, at most two elementary screens can be spliced either along the X or Y axes, i.e. parallel either to columns C1 to CM or rows L1 to LN; however, there is no limit on the number of elementary screens spliced along the other axis.

Figure 4:
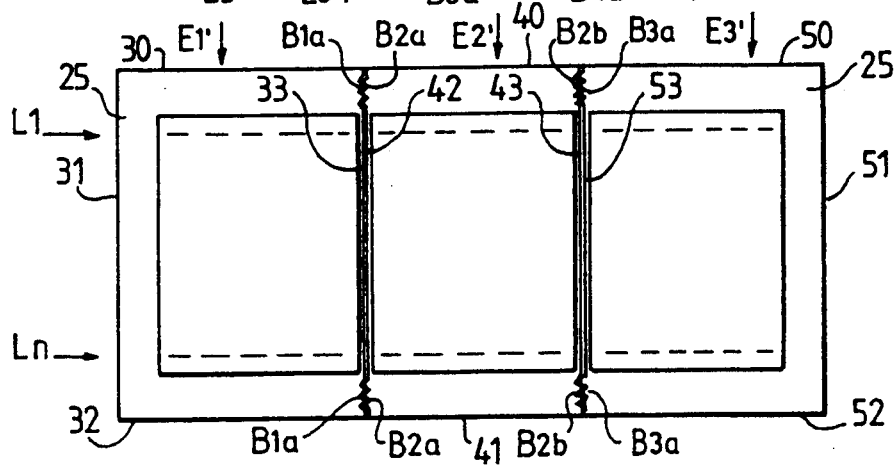
FIG. 4 represents another method of splicing the elementary screens shown in FIG. 1.

FIG. 4 illustrates such a case, in which matrix screen EM' is rectangular and produced from three elementary screens E1', E2' and E3', spliced together parallel to rows L1 to LN (in FIG. 4, rows L1 and LN are represented by dotted lines since the pixels are not shown individually but are represented by an active zone 26).

In this configuration, elementary screen E1' still has a peripheral zone 25 on its three outer edges 30, 31 and 32 and has two stop devices $B1_a$ at each end of its fourth side which forms the inner edge 33, perpendicular to rows L1 to Ln.

The second elementary screen E2' still has a peripheral zone 25 on two opposite edges 40 and 41, parallel to rows L1 to Ln. Each of the other internal edges 42 and 43, facing the first and third elementary screens E1' and E3' respectively, carries a stop device $B2_a$ and $B2_b$ at each end.

The third elementary screen E3' still has a peripheral zone 25 on its three external edges 50, 51 and 52 and carries a stop device $B3_a$ at each end of one internal edge 53.

It should be noted that, in the configuration shown in FIG. 4, elementary screens E1', E2' and E3' could be located solely by one stop device on each internal edge.

The precision of the cut-outs which form stop devices B1 to B4 must be compatible with the positioning accuracy required. Various machining methods can be used to achieve this such as, for example, ultrasonic methods. These methods offer advantages in that they can be used to cut fragile materials such as glass or silicon; their disadvantage is that the machining speed is low.

A preferred version of the invention uses an excimer laser to cut the internal edges of the elementary screens and produce the cut-outs, which form locking devices B1 to B4, in these internal edges. In this application, an excimer laser can operate at cutting speeds compatible with industrial requirements but still only require relatively simple facilities.

Figure 5:
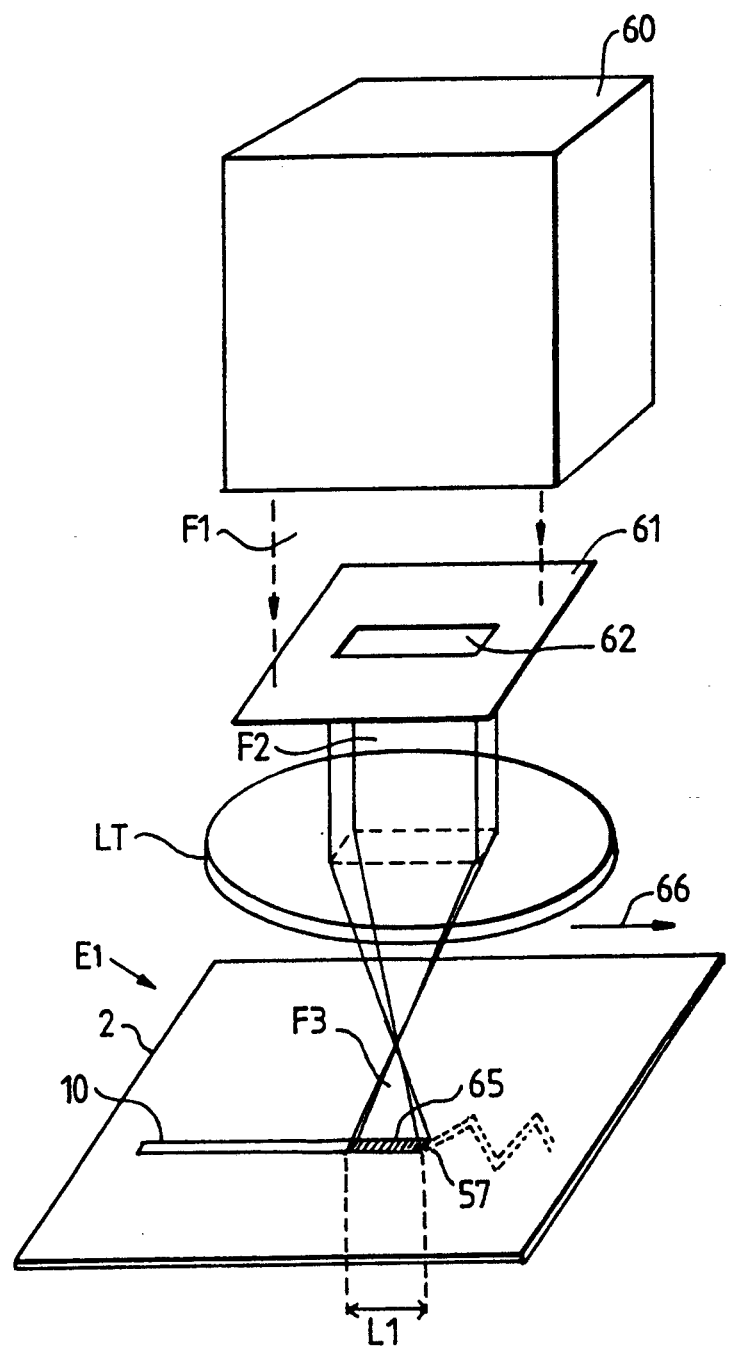
FIG. 5 schematically represents the use of an excimer laser to produce the cuts.

FIG. 5 schematically represents the use of a laser 60, preferably an excimer laser, to cut the internal edge 10 of an elementary screen E1; to simplify FIG. 5, elementary screen E1 is only represented by the substrate 2 from which it is produced.

Laser 60 generates a parallel beam F1 (lying between the two dotted lines). Beam F1 is passed through a mask 61 containing a rectangular aperture 62, forming a collimated rectangular beam F2. Collimated beam F2 is then focused by lens LT to form the "useful" beam F3 which is projected onto elementary screen E1.

Useful beam F3 forms a rectangular spot on the elementary screen and material is removed within this spot by the laser radiation. The length L1 of spot 65 can, for example, be approx 2 millimeters and its width approx 200 micrometer The straight-line cut along one internal edge 10 is produced, for example, by moving the elementary screen E1 under the useful beam F3 in the direction shown by arrow 66.

Assuming that the shape of stop device $B1_a$ is a sawtooth (shown in dotted lines on the figure), the straight-line cut is continued up to end 57 of the straight edge. The direction of the cut is then changed by modifying the alignment of elementary screen E1 relative to rectangular aperture 62 in mask 61, the mask being positioned in succession above each of the dotted lines which represent the sawtooth. The minimum length of each dotted line, if the dotted line is cut without moving the elementary screen E1 under useful beam F3, is the length L1 of spot 65. Obviously, length L1 of spot 65, and therefore the aperture 62 in mask 61, must be reoriented relative to the elementary screen E1 to cut each dotted line.

The various cuts are positioned relative to mechanical data which exist on all elementary screens E1 to E4, for example relative to the position of a given line of pixels. The precision with which the cuts are indexed is the same as the precision of the cutting equipment, which can easily be better than ±10 micrometers. Obviously, the positioning operations allow for the fact the cuts must alternately produce recesses (female part) and protrusions (male part) and that the male parts along the edge of one elementary screen must lie opposite the female parts on the edge of the adjacent elementary screen.

Consequently, the invention makes alignment or indexing simple, achieved in a single operation during cutting, whereas the prior art required an initial alignment, at the time of cutting, and a second particularly delicate alignment when the elementary screens were assembled.

What is claimed is:

1. A method for manufacturing a large size matrix screen comprising the steps of forming at least two large size elementary screens each having lateral dimensions of more than ten centimeters and each carrying a respective bidimensional matrix of active elements on a respective non-crystalline substrate, said method further comprising the step of cutting at least one side of each elementary screen by means of an excimer laser, said cutting operation forming a mechanical stop on said one side at an edge of the screen, the mechanical stop thus formed matching with a corresponding mechanical stop similarly formed on a side of an adjacent elementary screen to position the adjacent elementary screens relative to each other, and abutting said adjacent elementary screens side to side, with said mechanical stops of adjacent screens in corresponding abutment.

2. A method according to claim 1, wherein the large size matrix screen is a photosensitive screen.

3. A method according to claim 1, wherein the large size matrix screen is an X-ray radiation detecting screen.

4. A method according to claim 1, wherein the large size matrix screen is a display screen.

5. A method according to claim 1, wherein the mechanical stop device has a sawtooth shape.

6. A method according to claim 1, wherein the mechanical stop has a notch shape.

7. A method according to claim 1, wherein the mechanical stop has a circular shape.

8. A method for manufacturing a large size matrix screen comprising the steps of forming at least two large size elementary screens each having lateral dimensions of more than ten centimeters and each carrying a respective bidimensional matrix of active elements on a respective non-crystalline substrate, said matrix surrounded by a peripheral edge derived from active elements, said method comprising the step of cutting each elementary screen by means of an excimer laser along at least one side of the screen in the immediate vicinity of the respective matrix of active elements, so as to remove a lateral portion of substrate derived of active elements on said one side of the screen, and during this cutting operation forming a mechanical stop on the edge of the screen outside the matrix of active elements, the mechanical stop thus formed matching with a corresponding mechanical stop similarly formed on one side of an adjacent elementary screen to position the adjacent elementary screens relative to each other, and abutting said adjacent elementary screens side to side, with said mechanical stops of adjacent screens in corresponding abutment.

* * * * *